US009111402B1

(12) United States Patent
Krishnan et al.

(10) Patent No.: US 9,111,402 B1
(45) Date of Patent: Aug. 18, 2015

(54) SYSTEMS AND METHODS FOR CAPTURING EMPLOYEE TIME FOR TIME AND ATTENDANCE MANAGEMENT

(71) Applicant: REPLICON, INC., Calgary (CA)

(72) Inventors: Praveen Krishnan, Pacifica, CA (US); Richard Huska, San Francisco, CA (US); Raj Narayanswamy, Palo Alto, CA (US)

(73) Assignee: Replicon, Inc., Calgary (CA)

( * ) Notice: Subject to any disclaimer, the term of this patent is extended or adjusted under 35 U.S.C. 154(b) by 140 days.

(21) Appl. No.: 13/663,451

(22) Filed: Oct. 29, 2012

Related U.S. Application Data

(60) Provisional application No. 61/553,884, filed on Oct. 31, 2011.

(51) Int. Cl.
*G06K 9/00* (2006.01)
*G07C 9/00* (2006.01)

(52) U.S. Cl.
CPC .................................. *G07C 9/00158* (2013.01)

(58) Field of Classification Search
None
See application file for complete search history.

(56) References Cited

U.S. PATENT DOCUMENTS

| | | | | |
|---|---|---|---|---|
| 4,821,118 | A * | 4/1989 | Lafreniere | 348/156 |
| 7,602,942 | B2 * | 10/2009 | Bazakos et al. | 382/103 |
| 7,681,791 | B1 * | 3/2010 | Beveridge | 235/385 |
| 7,840,064 | B2 * | 11/2010 | Chhibber et al. | 382/165 |
| 7,876,352 | B2 * | 1/2011 | Martin | 348/157 |
| 7,983,452 | B2 * | 7/2011 | Chaney et al. | 382/115 |
| 8,089,340 | B2 * | 1/2012 | Cochran et al. | 340/5.7 |
| 8,325,994 | B2 * | 12/2012 | Davida | 382/115 |
| 8,364,971 | B2 * | 1/2013 | Bell et al. | 713/186 |
| 2003/0044050 | A1 * | 3/2003 | Clark et al. | 382/115 |
| 2004/0008872 | A1 * | 1/2004 | Goldberg | 382/115 |
| 2005/0110610 | A1 * | 5/2005 | Bazakos et al. | 340/5.82 |
| 2006/0270421 | A1 * | 11/2006 | Phillips et al. | 455/457 |
| 2007/0086626 | A1 * | 4/2007 | Mariani et al. | 382/115 |
| 2007/0106561 | A1 * | 5/2007 | Lubow | 705/26 |
| 2008/0041942 | A1 * | 2/2008 | Aissa | 235/382 |
| 2008/0212849 | A1 * | 9/2008 | Gao | 382/118 |
| 2009/0127328 | A1 * | 5/2009 | Aissa | 235/377 |
| 2009/0251560 | A1 * | 10/2009 | Azar et al. | 348/222.1 |
| 2010/0223663 | A1 * | 9/2010 | Morimoto et al. | 726/7 |

(Continued)

OTHER PUBLICATIONS

TimeStation—Attendance&Time Tracking; www.mytimestation.com, Oct. 13, 2011.*

(Continued)

*Primary Examiner* — Randolph I Chu
(74) *Attorney, Agent, or Firm* — Fish & Richardson P.C.

(57) ABSTRACT

Systems and techniques to capture employee time for time and attendance management are disclosed. In general, in one implementation, a technique includes using a multi-touch tablet style device as a Cloud Clock for capturing employee time. Employees will punch in and out at the device by standing in front of the Cloud Clock with a personal ID card. The Cloud Clock device will use its front-facing video camera to identify the employee and log the time in a web-based application that tracks employee work hours. Such a Cloud Clock can also be used as a self-service station where employees can access their schedules, request time-off, and trade shifts. Such Cloud Clocks can be loaded with management software that allows the clocks to be remotely monitored for anomalies. The Cloud Clocks can also be updated remotely without requiring user intervention at the clock.

25 Claims, 11 Drawing Sheets

(56) References Cited

U.S. PATENT DOCUMENTS

| | | | | |
|---|---|---|---|---|
| 2011/0306304 | A1* | 12/2011 | Forutanpour et al. | 455/67.11 |
| 2012/0114190 | A1* | 5/2012 | Bladel et al. | 382/115 |
| 2012/0148115 | A1* | 6/2012 | Birdwell et al. | 382/116 |
| 2012/0280049 | A1* | 11/2012 | Bennett | 235/494 |
| 2012/0316963 | A1* | 12/2012 | Moshfeghi | 705/14.58 |
| 2013/0030931 | A1* | 1/2013 | Moshfeghi | 705/16 |
| 2013/0054271 | A1* | 2/2013 | Langford et al. | 705/3 |
| 2013/0089244 | A1* | 4/2013 | Acosta-Cazaubon | 382/118 |
| 2013/0146658 | A1* | 6/2013 | Guerra | 235/380 |
| 2013/0216109 | A1* | 8/2013 | Ishikawa et al. | 382/118 |
| 2014/0358632 | A1* | 12/2014 | Graff et al. | 705/7.29 |
| 2015/0088751 | A1* | 3/2015 | Grigg et al. | 705/44 |

OTHER PUBLICATIONS

JobClock Austraila:Portable Time Tracking and Mobile . . . ; www.jobclock.com.au, Jul. 8, 2010.*

* cited by examiner

SYSTEMS AND METHODS FOR CAPTURING EMPLOYEE TIME FOR TIME AND ATTENDANCE MANAGEMENT

CROSS-REFERENCE TO RELATED APPLICATION

This application claims priority to U.S. Provisional Application Ser. No. 61/553,884, entitled "Systems and Methods for Capturing Employee Time for Time & Attendance Management", filed on Oct. 31, 2011, the entire contents of which are incorporated herein by reference.

TECHNICAL FIELD

This document relates to techniques and methods to capture employee work time as part of a time and attendance management solution.

BACKGROUND

Businesses can track the amount of time their employees spend at work using specially-designed time clocks. Time clocks allow employees to enter the time they begin working and again enter the time when the employee ends working. Time clocks generally range from mechanical clocks that require an employee has to insert and punch a paper card to electronic time clocks that allow employees to swipe magnetic identification cards to register times. Time clocks can be standalone hardware devices that are installed on a business's premises. Time clocks typically interact with an electronic system that stores time entries that are submitted to the time clock. Such time clocks can require regular maintenance from qualified personnel.

SUMMARY

Systems and methods relating to capturing employee data for time and attendance management are described. In general, in one implementation, a technique for capturing employee time and attendance includes using a multi-touch tablet device as a time clock (hereinafter "Cloud Clock"). Employees can interact with the multi-touch table device to punch in, e.g., record a time they begin working, and to punch out, e.g., record a time they stop working. In some implementations, employees can punch in and punch out using the multi-touch tablet device by standing in front of the Cloud Clock with a personal identification ("ID") card. The Cloud Clock device can use a front-facing video camera to identify employees and log their respective time records each time the employees punch in and punch out. In some implementations, the Cloud Clock logs the times in a web-based application that tracks employee work hours. In some implementations, the Cloud Clock can be used as a self-service station at which employees can access their schedules, request time-off, or revise their schedules (e.g., trade shifts with other employees). The Cloud Clocks can be loaded with management software that allows the Cloud Clocks to be remotely monitored for anomalies. The Cloud Clocks can also be updated remotely without requiring user intervention at the Cloud Clock.

The Cloud Clock can include a capacitive touch panel for multi-touch user interaction, a front-facing video camera to capture digital images of employees and identification cards, WiFi connectivity to an application cloud, a Global Positioning System (GPS) for geo-fencing, an accelerometer for detecting unauthorized motion, a configurable software platform on the device for easy customization, an over-the-air remote management functionality, and an on-board battery to handle power outages.

DETAILED DESCRIPTION

Figure 1:
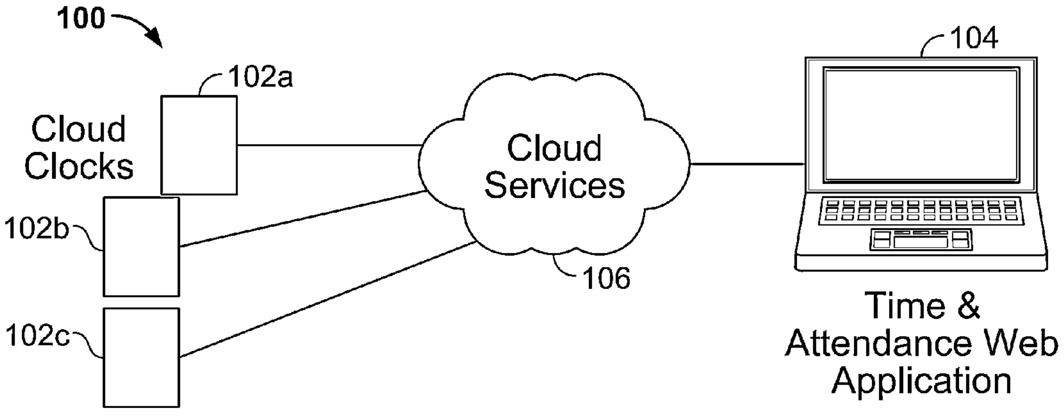
FIG. 1 is a schematic representation of a system for tracking time and attendance using a cloud infrastructure.

FIG. 1 is a schematic representation of a system 100 for tracking time and attendance using a cloud infrastructure. The system includes one or more Cloud Clocks 102*a-c*, a Time & Attendance web application running on one or more application servers 104, and a cloud service 106. Each Cloud Clock 102*a-c* can be securely connected (e.g., using Secure Sockets Layer) to application servers 104 over a network (e.g., Internet).

Time entries can be synchronized between Cloud Clocks and application servers 104 in real time over a network. In some implementations, the data can be sent over authenticated and encrypted channels to the application servers. The Cloud Clocks 102*a-c* can be sold along with a wireless access point that is pre-configured to work with the Cloud Clocks 102*a-c*. This enables customers to quickly setup the Cloud Clocks 102*a-c* and establish connectivity with the application servers 104.

In some implementations, the Cloud Clock can be remotely monitored by a service in the cloud for faults including power outages and network outages. Any loss of power or network connectivity to the Cloud Clock can be automatically detected by the server. Upon detection, the appropriate personnel (e.g., local administrators) can be notified (e.g., notified through email or text messages).

In some implementations, the Cloud Clock can run a monitor client program in the background that continuously measures the wireless network strength, the remaining power in the battery and the charging status. The monitor client program can send periodically (in response to a trigger event or request) heartbeats to a monitoring service. Each heartbeat can include measurements of the network, power, and charging state. The monitoring service can check the incoming heart beats of each clock against thresholds to determine if a Cloud Clock is losing power or has poor network connectivity.

In some implementations, the Cloud Clock can be remotely monitored by a service for theft or unauthorized movement from an installed location. An accelerometer (or other motion sensor) and/or on-board GPS can be used to detect unauthorized movement of the Cloud Clock and local administrators will be notified. The Cloud Clock can be loaded with management software that allows the clocks to be remotely monitored for anomalies. The Cloud Clock can also be updated remotely without requiring user intervention at the Cloud Clock.

For example, when a clock is accidentally or intentionally pulled or displaced from its mounting, the on board accelerometer will detect the motion and send an alert to a monitoring service in the cloud. Managers can track these alerts and suitable action can be taken to restore the Cloud Clock to its original setting. In some cases, the on board GPS receiver can be utilized to track the movement of the Cloud Clock from the point of its original setting. For example, the GPS receiver can be used to track a person who is carrying the Cloud Clock away from its mounting location.

Installation & Setup

Figure 2:
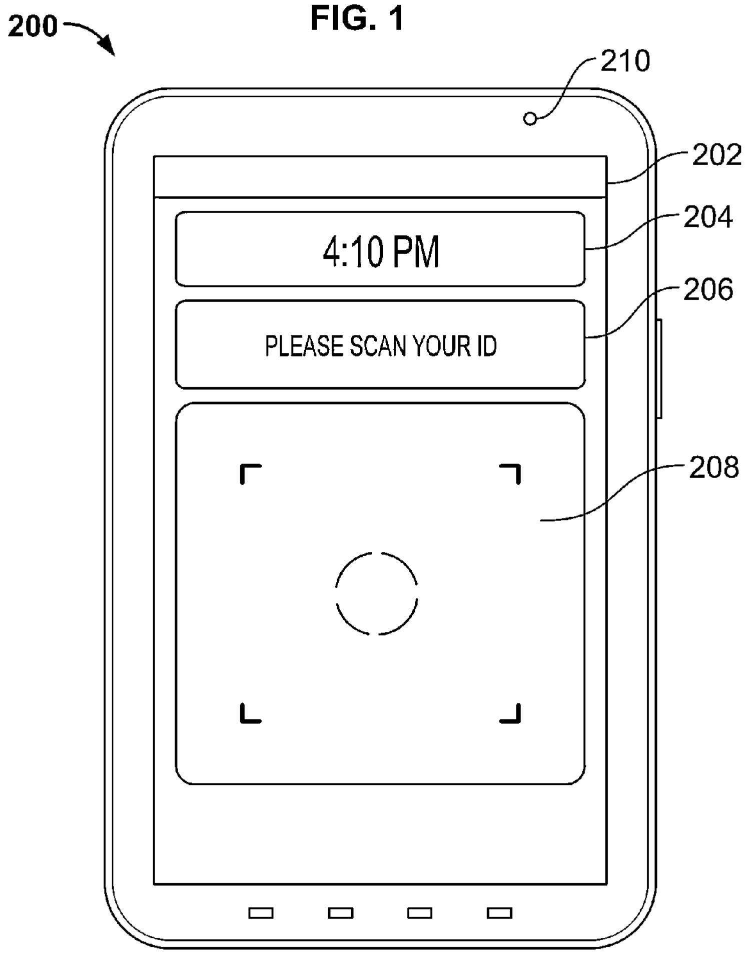
FIG. 2 illustrates a multi-touch, full screen Cloud Clock.

FIG. 2 illustrates a multi-touch, full screen Cloud Clock 200, e.g., a Cloud Clock 102*a*, 102*b*, or 102*c*. The Cloud Clock 200 includes a display 202 and a camera 210. The display 202 can be graphical user interface (GUI) that includes a first region 204 for displaying a current time and date, a second region 206 for displaying messages or instructions (e.g., "Please scan your ID"), and a third region 208 for displaying an image or video feed for images captured using the camera 210.

The Cloud Clock 200 can be mounted on a powered pedestal or setup on a desktop or mounted securely on a wall. The Cloud Clock 200 can be connected at all times wirelessly to application servers over a network (e.g., Internet) in a secure way (e.g., using Secure Sockets Layer). A customer who purchases the Cloud Clock 200 will be able to install and deploy the Cloud Clock 200 in a few simple steps.

Geo Fencing

In some implementations, the Cloud Clock is capable of restricting its operation within a geo-fence. A geo-fence can be a specified geographic boundary outside of which employees are not allowed to register time. The Cloud Clock can be configured to operate within a specified geo-fence. The Cloud Clock includes an onboard Global Positioning System (GPS) that can be used to detect whether the Cloud Clock is or is not within the geo-fence for authorized operation.

In some implementations, the Cloud Clock can be used as a mobile check-in and check-out station that allows employees to punch in and punch out in cases where an employer requires its employees to punch in and out at an offsite location. For example, road crews who need to meet at a job site can punch in at the Cloud Clock that is configured to operate within a geo-fence encompassing the job site.

Capturing Employee Punches

Figure 3:
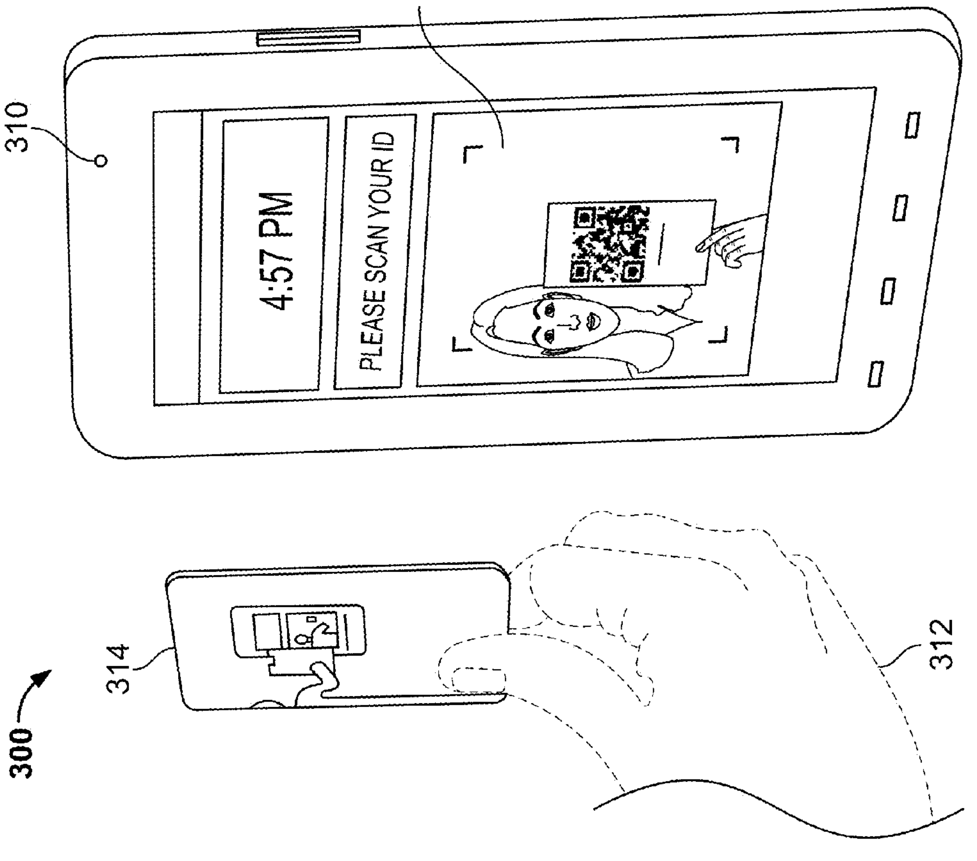
FIG. 3 illustrates an employee interacting with a Cloud Clock.

FIG. 3 illustrates an employee 312 interacting with a Cloud Clock 300. The Cloud Clock 300 includes a display 302 and a camera 310. The display 202 can be graphical user interface (GUI) that includes a first region 304 for displaying a current time, a second region 306 for displaying messages or instructions (e.g., "Please scan your ID"), and a third region 308 for displaying an image or video feed for images captured using the camera 310.

In FIG. 3, an employee 312 is shown as "punching in," or registering their time by presenting themselves in front of the camera 310 and by flashing an identification ("ID") card 314 to the Cloud Clock 300. The display region 308 displays a live video frame of the ID card 314 that has been captured using the camera 310. Software running on the Cloud Clock 300 can be configured to log in the employee 312 by capturing a live video frame of the employee 312 and the ID card 314 using a front facing camera 310 of the Cloud Clock 300 and then processing the captured frame. The software and/or hardware in the Cloud Clock 300 can use a combination of image processing techniques and face recognition techniques to process the captured frame. As a result of the processing, the Cloud Clock 300 can read an ID code printed on the ID card 314. Further, the Cloud Clock 300 can identify the employee by recognizing the face of the employee 312. If the identified employee matches the employee associated with the ID code printed on the ID card 314, the Cloud Clock 300 can register the time entry for the employee 312, as shown in FIG. 4.

Cloud Clock Operation

Figure 4:
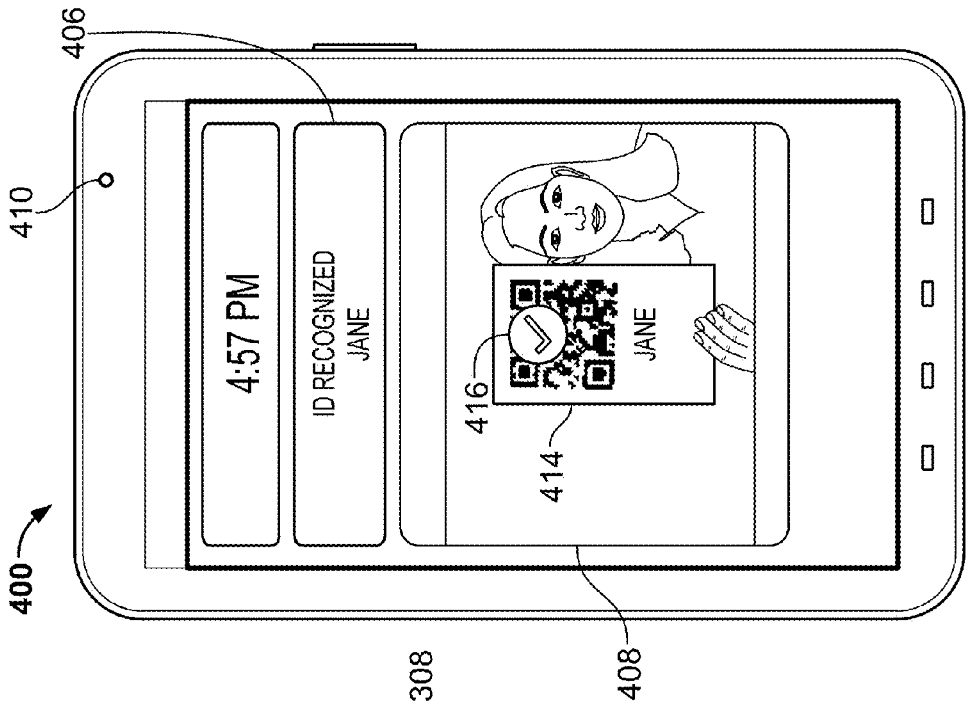
FIG. 4 illustrates a Cloud Clock processing an ID card.

FIG. 4 illustrates a Cloud Clock 400 processing an employee login. In FIG. 4, the Cloud Clock 400 is shown as processing a captured frame of a person holding an ID card 414. In some implementations, the Cloud Clock 400 can process the captured image by identifying the person holding the ID card, identifying an employee associated with the information (e.g., QR code) printed on the ID card 414, and determining whether the identified person matches the employee associated with the information printed on the ID card 414.

The Cloud Clock 400 is configured to read the ID card 414 using a combination of image processing techniques. Once the ID card 414 is read, the Cloud Clock 400 can process information printed on the ID 414 (e.g., a bar code or a QR code) to register the time entry of an employee that presented the ID card 414. In FIG. 4, the display region 408 depicts a captured live video frame of an ID card 414. In some implementations, the display region 408 can display an authenticated icon 416 indicating that the ID card 414 has been authenticated.

In some implementations, the image processing techniques include a bar code recognition process used to recognize one or two-dimensional bar codes (e.g., QR code) printed on the ID card 414 and captured in the video frame 408. As described in FIG. 3, the employee can flash an ID card 414 in front of the camera 410. The camera 410 can capture a video frame of the face of the employee flashing the ID card 414. The image processing can be applied to at least a portion of the captured video frame that contains identifying information (e.g., a code). One or more image processing operations can be performed to the captured video frame including, but not limited to, image binarization, image tilt correction, image orientation, image geometric correction, and image normalization. This image processing allows images to be collected under different illumination conditions, different acquisition angles, and allows employees to be quickly identified based on the ID codes printed on the ID cards.

The Cloud Clock 400 is capable of capturing and storing an image of the employee that is registering their time. The captured image can be used for biometric employee authentication using various face recognition techniques. In some implementations, face recognition processing can use one or more of the following face recognition/verification processes: Principal Component Analysis using eigenfaces, Linear Discriminate Analysis, Elastic Bunch Graph Matching using the Fisherface algorithm, the Hidden Markov model and neuronal motivated dynamic link matching. In some implementations, face recognition/verification techniques (e.g., supervised learning, Viola-Johns face detection) can be used in a manner that adheres to the LFW (Labeled Faces in the Wild) benchmark. The employee's captured image can be used in a photo audit trail, as shown in FIG. 5.

Graphical User Interface

Figure 5:
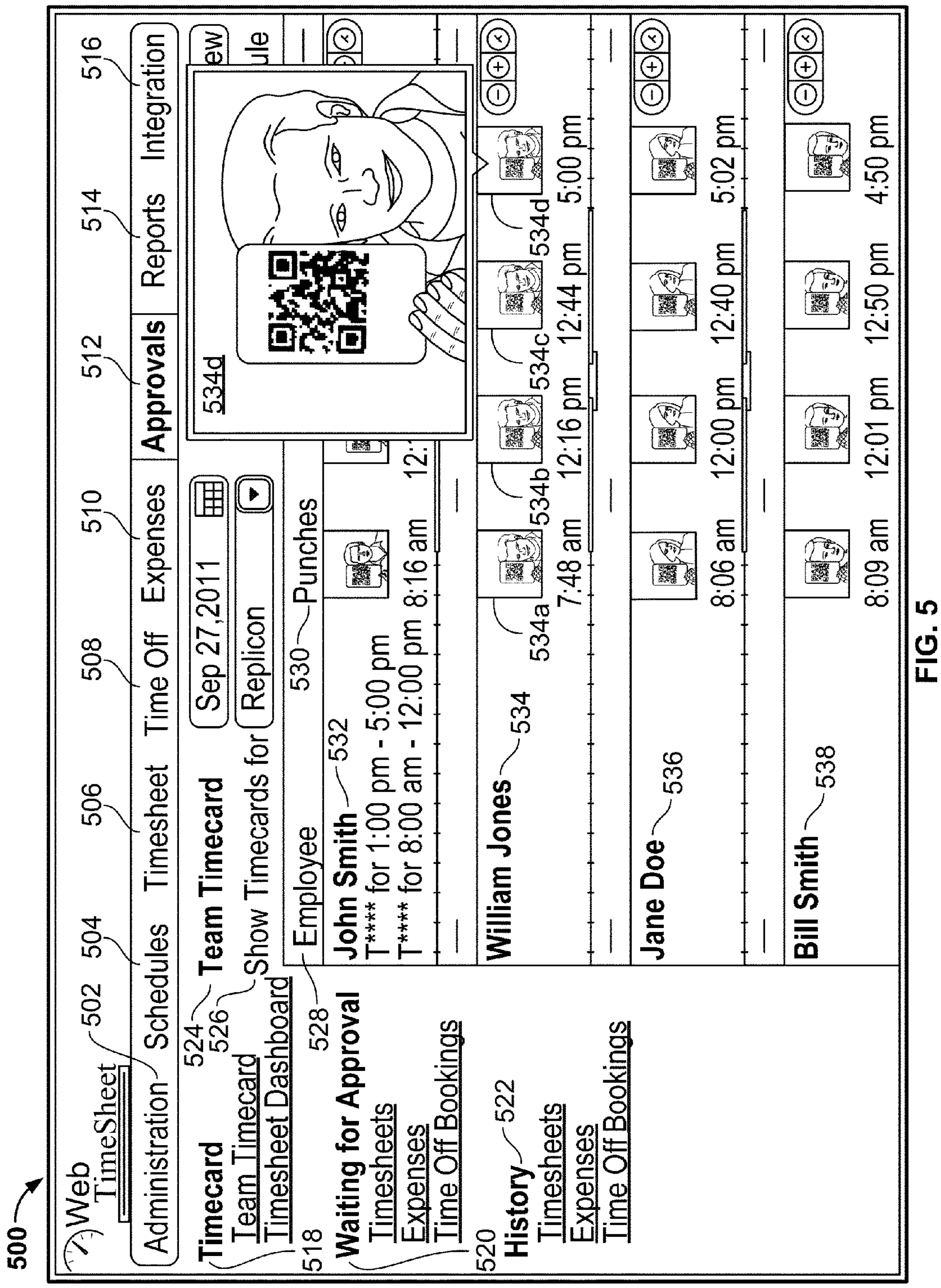
FIG. 5 illustrates a Cloud Clock time and attendance graphical user interface.

FIG. 5 illustrates a Cloud Clock time and attendance graphical user interface (GUI) 500. The GUI 500 can be presented, for example, in a Time & Attendance self-service kiosk or web-based application, as described above. The GUI 500 includes an option 502 for viewing options directed to administration of employee schedules, an option 504 for viewing employee schedules, an option 506 for viewing employee timesheet records, an option 508 for viewing employee time off requests, an option 510 for viewing expenses incurred with respect to employee time off requests, an option 512 for viewing approvals for employee time off requests, an option 514 for viewing reports of employee time records, and an option 516 for integration.

The GUI 500 also includes options 518 for viewing time records (e.g., timecards) for a group of individuals in a team and also a timesheet dashboard for viewing multiple timesheets for a group of individuals in a team in one interface. The GUI 500 also includes options 520 for viewing items (e.g., timesheets, expenses, time off requests) that are pending approval. The GUI 500 also includes options 522 for viewing a history of items (e.g., timesheets, expenses, time off requests).

The GUI 500 displays photo audit trails for employees 532, 534, 536, and 538. Each employee's photo audit trail includes respective time records (e.g., times when the employee punched in or punched out) and respective images of the employee that were taken at the time the employee punched in or punched out. For example, a photo audit trail 534 for employee William Jones displays time records **534*a* ("7:48 am"), 534*b* ("12:16 pm"), 534*c* ("12:44 pm"), and 534*d* ("5: 00 pm") and respective images taken of the employee at those times. Users can select (e.g., using a mouse click or hover) one of the respective images to view a larger version of the image as illustrated using the image for the time record 534*d***.

Users can select an option 524 to select a time range for viewing time records (e.g., times when the employee punched in or punched out) within that time range. For example, users can select a particular date as the time range and the GUI 500 can display time records for employees for that particular date. The time range can be specified in other ways including a range within two times (e.g., between 3:00 pm and 4:00 pm), day of the week, week, month, or year. Supervisors can review this photo audit trail as part of their routine to identify employees who have proxies punching in and out for them.

Figure 6:
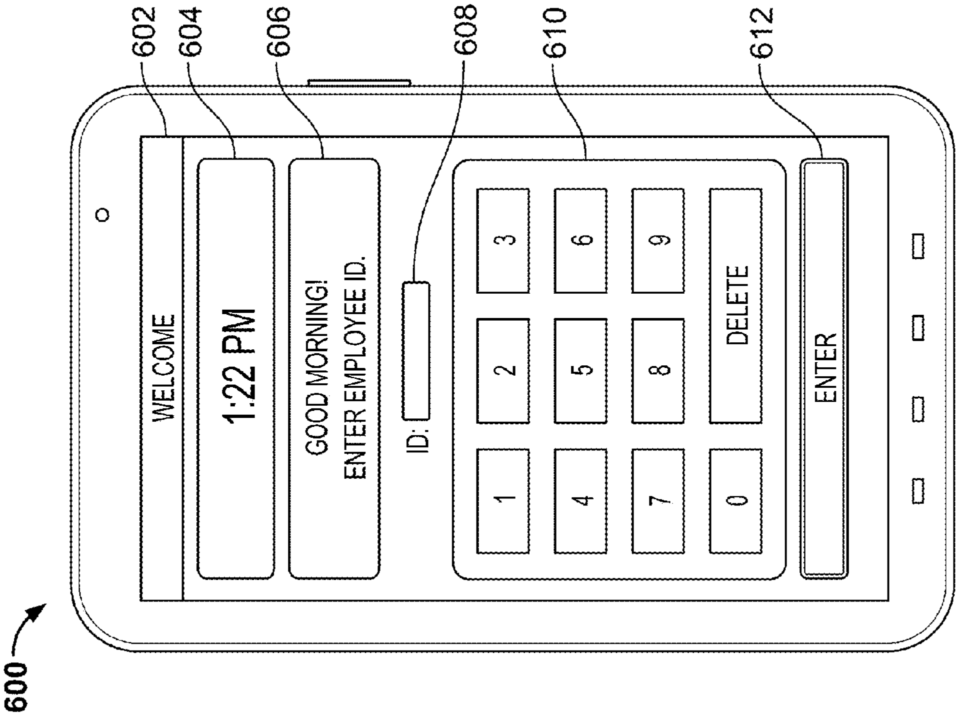
FIG. 6 illustrates a Cloud Clock employee login interface.

FIG. 6 illustrates a Cloud Clock employee login interface 600. The interface 600 includes a welcome message display 602, a time display 604, a status display 606, an employee identifier ("ID") display 608, a touch keypad 610, and a submission button 612. In some implementations, employees can interact with the interface 600 to punch in and punch out without an ID card by inputting their ID number using the touch keypad 610. The interface 600 can update the ID display 608 to display the ID number as it is being input by the employee. Once inputting of the ID number is complete, the employee can begin the login process by selecting the submission button 612.

Figure 7:
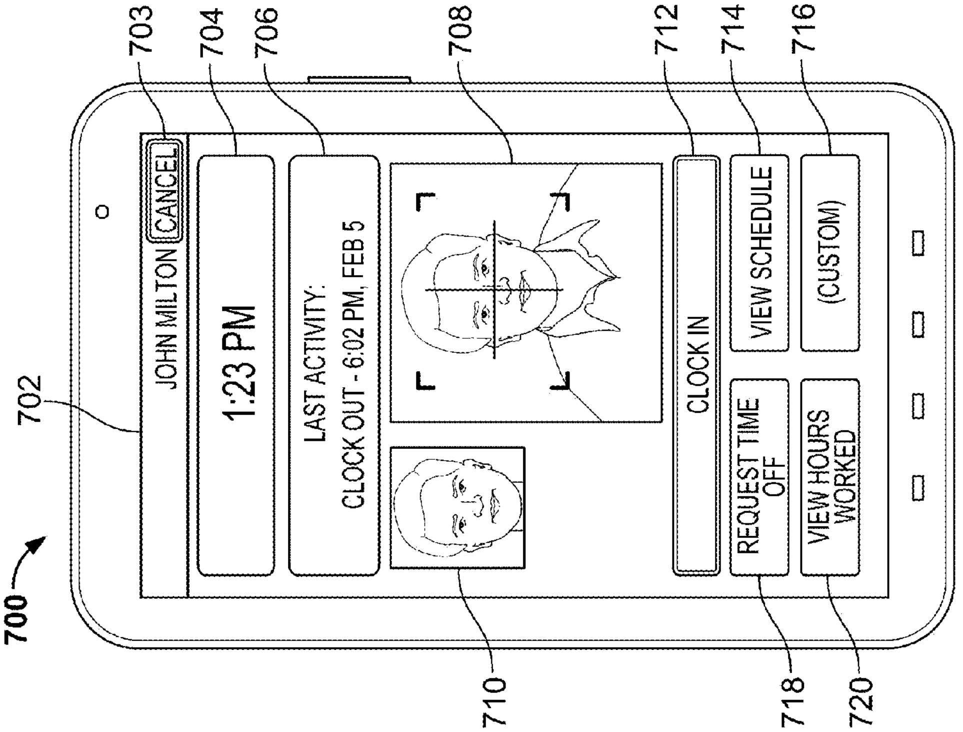
FIG. 7 illustrates a Cloud Clock employee time and attendance management interface.

FIG. 7 illustrates a Cloud Clock employee time and attendance management interface 700. The interface 700 includes a name display field 702, a logout option 703, a time display 704, a status display 706, a video display 708, an employee photo display 710, and self-service options 712, 714, 716, 718, 720. The employee time and attendance management interface 700 is displayed once an employee has logged in, as described in reference to FIG. 6.

The name display field 702 displays the name of the employee. The time display 704 displays a time that will be used to register a time entry for the employee. The status display 706 displays the employee's last time entry activity.

Using the interface 700, the employee can select an option 712 to punch in ("Clock In"), an option 714 to view the employee's schedule ("View Schedule"), an option 716 can be customized to perform a function to the employee's liking ("Custom"), an option 718 to request time off ("Request Time Off"), and an option 720 to view the hours the employee has worked ("View Hours Worked").

Figure 8:
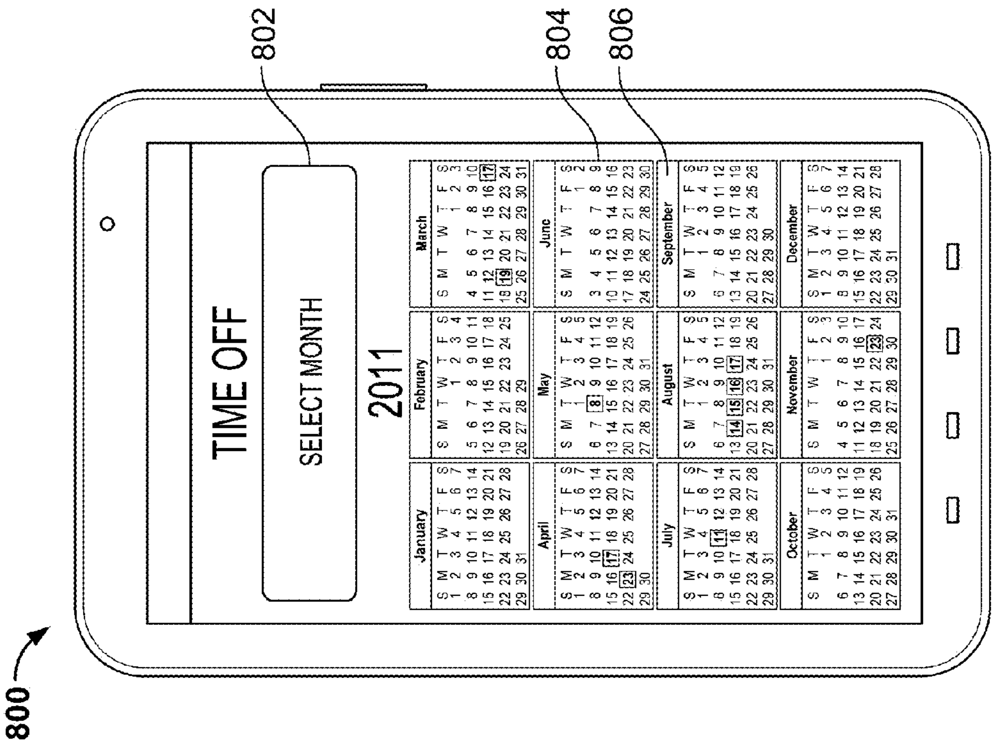

FIG. 8 illustrates a self-service time off request interface 800. In FIG. 8, the interface 800 is displayed in response to an employee requesting time off, as described in reference to FIG. 7. The interface 800 includes a display 802 that is configured to provide instructions (e.g., "Select Month"). The interface 800 also displays a calendar 804. The calendar 804 includes tiles (e.g., the 806) that each reference a month in a given year. The employee can view days in a given month by selecting a respective tile. For example, the employee can view days in the month of September by selecting the tile 806. In some implementations, the employee can select a month by selecting the display 802, and by selecting the month from a drop-down menu.

Figure 9:
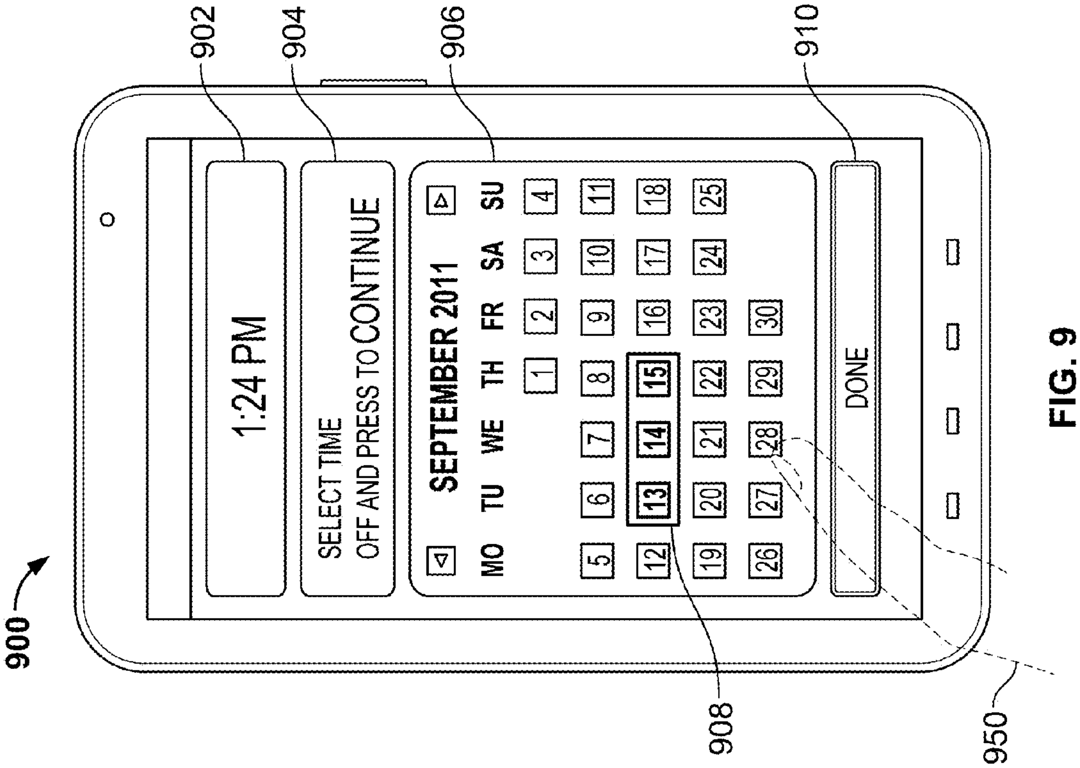
FIGS. 8-10 illustrate a Cloud Clock self-service time off request interface.

FIG. 9 illustrates a self-service time off request interface 900. In FIG. 9, the interface 900 is displayed in response to an employee selecting a tile referencing a month (e.g., tile 806) as described in reference to FIG. 8. The interface 900 includes a status display that is configured to display instructions (e.g., "Select Time Off and Press to Continue"). The interface 900 displays a calendar for the selected month 906. The employee 950 can select one or more days 908 to request time off. For example, the employee 950 is shown as having selected September 13-15. The employee can select the button 910 (e.g., "Done") to complete the time off request.

Figure 10:
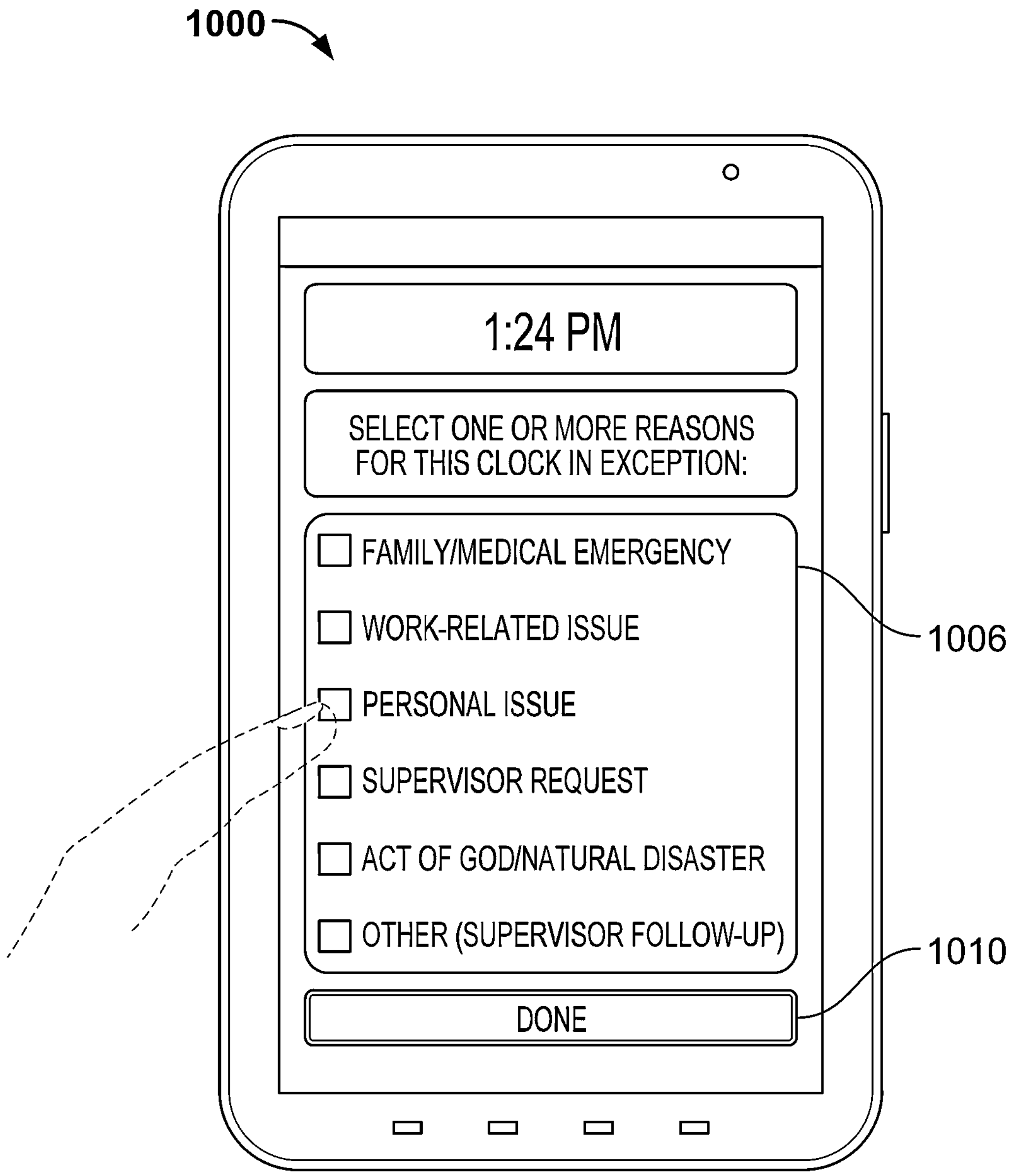

FIG. 10 illustrates a self-service time off request interface 1000. In FIG. 10, the interface 1000 is displayed in response to an employee selecting one or more days off as described in reference to FIG. 9. The employee can interact with the interface 1000 to select one or more reasons 1006 for requesting time off. The reasons can include, for example, "family/medical emergency," "work-related issue," "personal issue," "supervisor request," "act of god/natural disaster," or "other (supervisor follow-up)." The employee can select the button 1010 (e.g., "Done") to complete the time off request. As described in this specification, options and buttons can be selected by employees by touch or by using an implement (e.g., a stylus).

Figure 11:
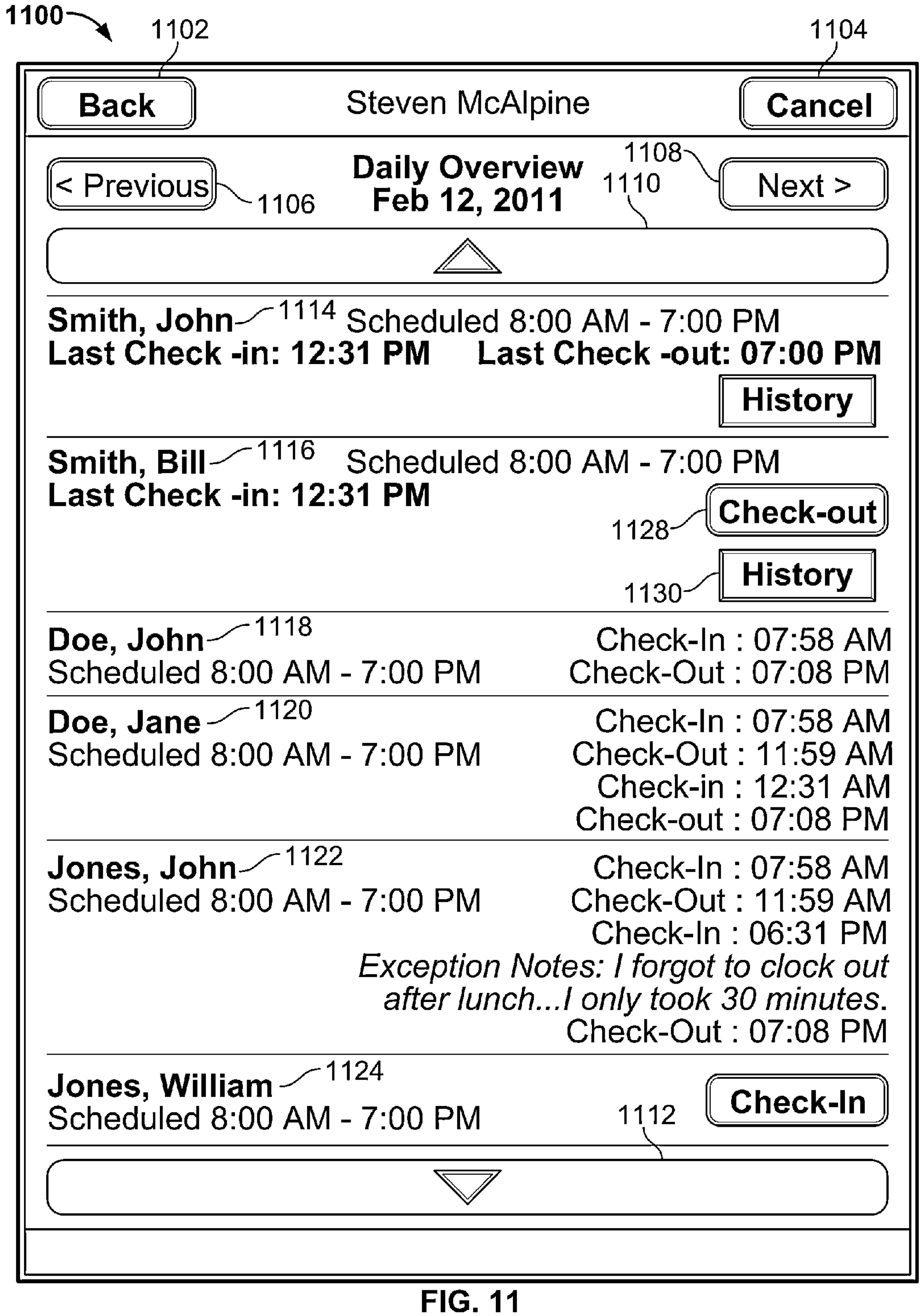
FIG. 11 illustrates an exemplary Cloud Clock timecard dashboard interface.

FIG. 11 illustrates an exemplary timecard dashboard interface 1100. The timecard dashboard 1100 includes a back button 1102 for returning to a previous menu screen, a cancel button 1104 to exit the timecard dashboard interface 1100. The timecard dashboard interface 1100 displays timecard information for employees 1114 ("John Smith"), 1116 ("Bill Smith"), 1118 ("John Doe"), 1120 ("Jane Doe"), 1122 ("John Jones"), and 1124 ("William Jones"). For each employee, the timecard information includes a listing of respective punch in and punch out times for the employee. The timecard information also displays the scheduled shift time for the employee.

The timecard dashboard interface 1100 can also display one or more administrator options. In some implementations, administrator options can include a check-in option, a check-out option, or a view history option. The check-in option can be displayed when an employee that is scheduled for work on a given day has not punched in for the day. The check-out option can be displayed when an employee has not punched out for the day. The view history option can be displayed when an employee that is scheduled for work on a given day has not punched in or punched out for the day. For example, for employee 1116, the timecard dashboard interface 1100 displays a check-out option 1128 ("Check-out") and a view history option 1130 ("History").

The timecard dashboard interface 1100 includes a button 1106 (e.g., "Previous") and button 1108 (e.g., "Next") for navigating the timecard dashboard interface 1100. For example, the button 1106 can be selected to view timecard information for a previous day (e.g., Feb. 11, 2011) and the button 1108 can be selected to view timecard information for a subsequent day (e.g., Feb. 13, 2011). An administrator interacting with the timecard dashboard interface 1100 can scroll between timecard information for employees using scroll buttons 1110 and 1112.

Exemplary Process for Logging Employee Time Entries

Figure 12:
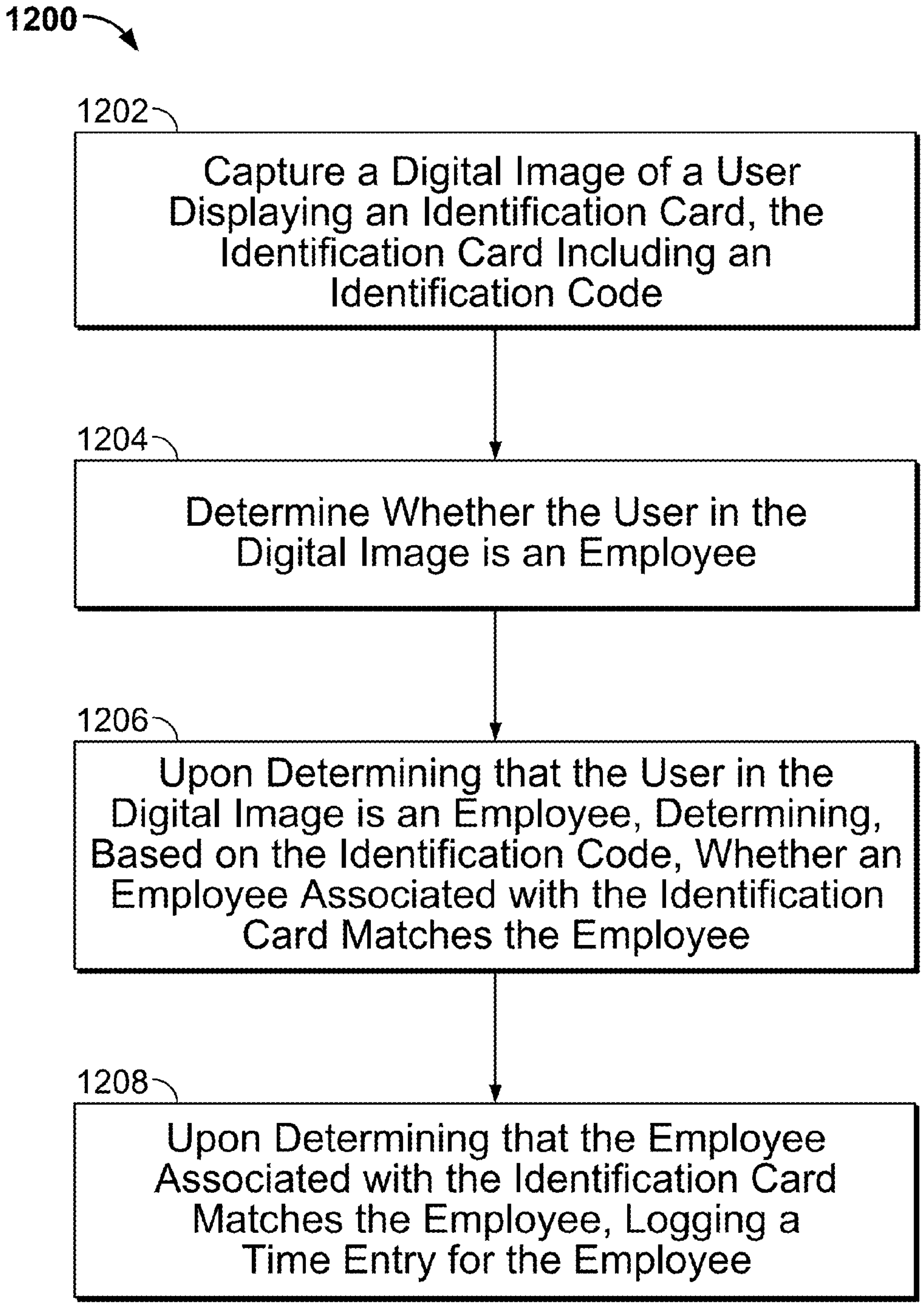
FIG. 12 is a flow diagram illustrating an example process for logging in an employee.

FIG. 12 is a flow diagram illustrating an example process 1200 for logging employee time entries. In the exemplary process 1200, a digital image of a user displaying an identification card is captured (1202). The identification card includes an identification code. A determination is made whether the user in the digital image is an employee (1204). Upon determining that the user in the digital image is an employee, a determination is made, based on the identification code, whether an employee associated with the identification card matches the employee (1206). Upon determining that the employee associated with the identification card matches the employee, a time entry for the employee is logged (1208).

Exemplary Operating Environment

Figure 13:
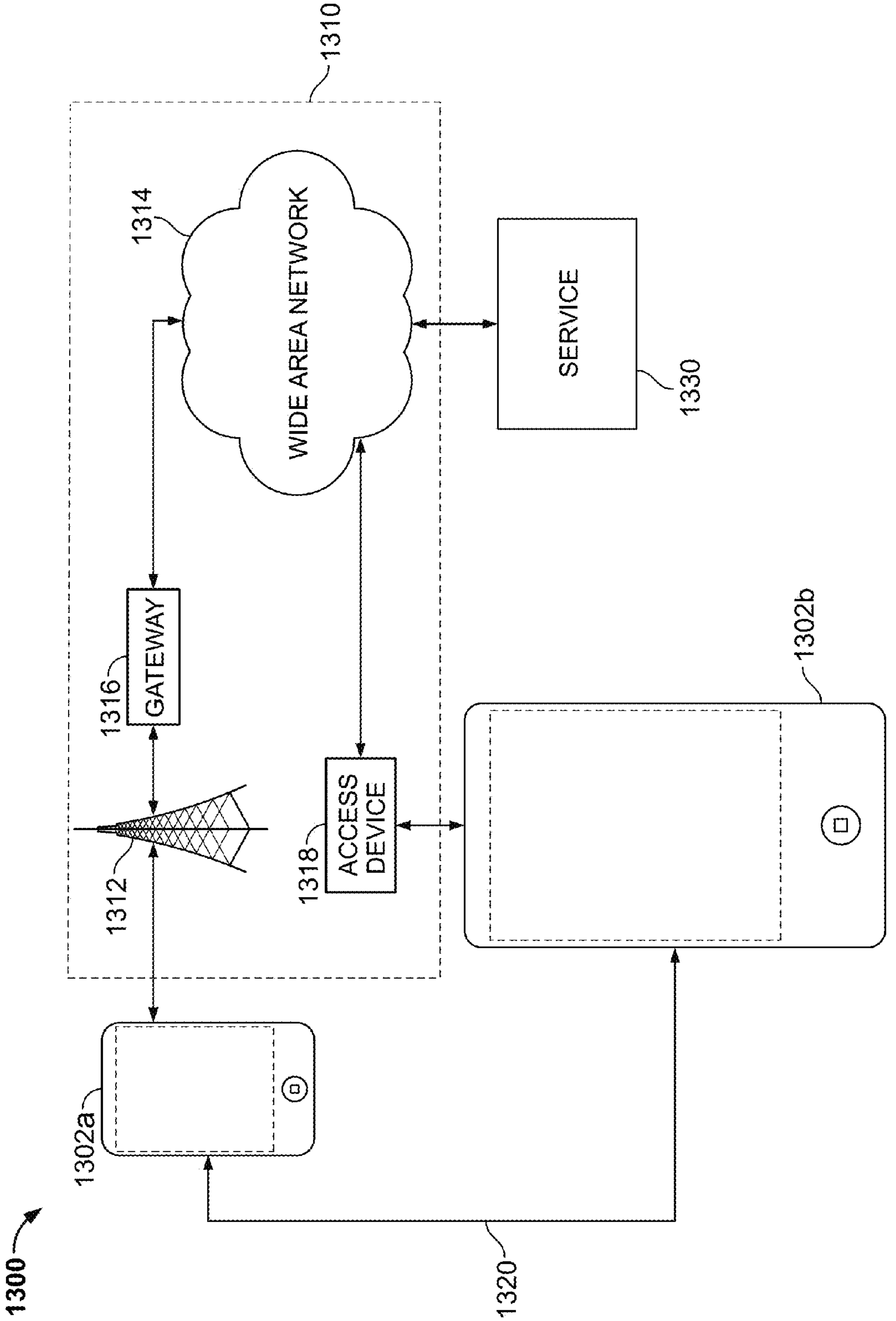
FIG. 13 is a block diagram of an exemplary operating environment for a Cloud Clock capable of running a network-enabled content authoring application.

FIG. 13 is a block diagram of an exemplary operating environment for a Cloud Clock device capable of running a network-enabled time and attendance management application. In some implementations, devices 1302*a* and 1302*b* can communicate over one or more wired or wireless networks 1310. For example, wireless network 1312 (e.g., a cellular network) can communicate with a wide area network (WAN) 1314 (e.g., the Internet) by use of gateway 1316. Likewise, access device 1318 (e.g., IEEE 802.11g wireless access device) can provide communication access to WAN 1314. Devices 1302*a*, 1302*b* can be any device capable of displaying GUIs of the time and attendance management application, including but not limited to portable computers, smart phones and electronic tablets. In some implementations, the devices 1302*a*, 1302*b* do not have to be portable but can be a desktop computer, television system, kiosk system or the like.

In some implementations, both voice and data communications can be established over wireless network 1312 and access device 1318. For example, device 1302*a* can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 1312, gateway 1316, and WAN 1314 (e.g., using Transmission Control Protocol/Internet Protocol (TCP/IP) or User Datagram Protocol (UDP)). Likewise, in some implementations, device 1302*b* can place and receive phone calls, send and receive e-mail messages, and retrieve electronic documents over access device 1318 and WAN 1314. In some implementations, device 1302*a* or 1302*b* can be physically connected to access device 1318 using one or more cables and access device 1318 can be a personal computer. In this configuration, device 1302*a* or 1302*b* can be referred to as a "tethered" device.

Devices 1302*a* and 1302*b* can also establish communications by other means. For example, wireless device 1302*a* can communicate with other wireless devices (e.g., other devices 1302*a* or 1302*b*, cell phones) over the wireless network 1312. Likewise, devices 1302*a* and 1302*b* can establish peer-to-peer communications 1320 (e.g., a personal area network) by use of one or more communication subsystems, such as the Bluetooth™ communication devices. Other communication protocols and topologies can also be implemented.

Devices 1302*a* or 1302*b* can communicate with service 1330 over the one or more wired and/or wireless networks 1310. For example, service 1330 can be an online service for time and attendance management that provides Web pages to client devices that include the features described in reference to FIGS. 1-11.

Device 1302*a* or 1302*b* can also access other data and content over one or more wired and/or wireless networks 1310. For example, content publishers, such as news sites, Really Simple Syndication (RSS) feeds, Web sites and developer networks can be accessed by device 1302*a* or 1302*b*. Such access can be provided by invocation of a web browsing function or application (e.g., a browser) running on the device 1302*a* or 1302*b*.

Devices 1302*a* and 1302*b* can exchange files over one or more wireless or wired networks 1310 either directly or through service 1330.

Exemplary Clock Device Architecture

Figure 14:
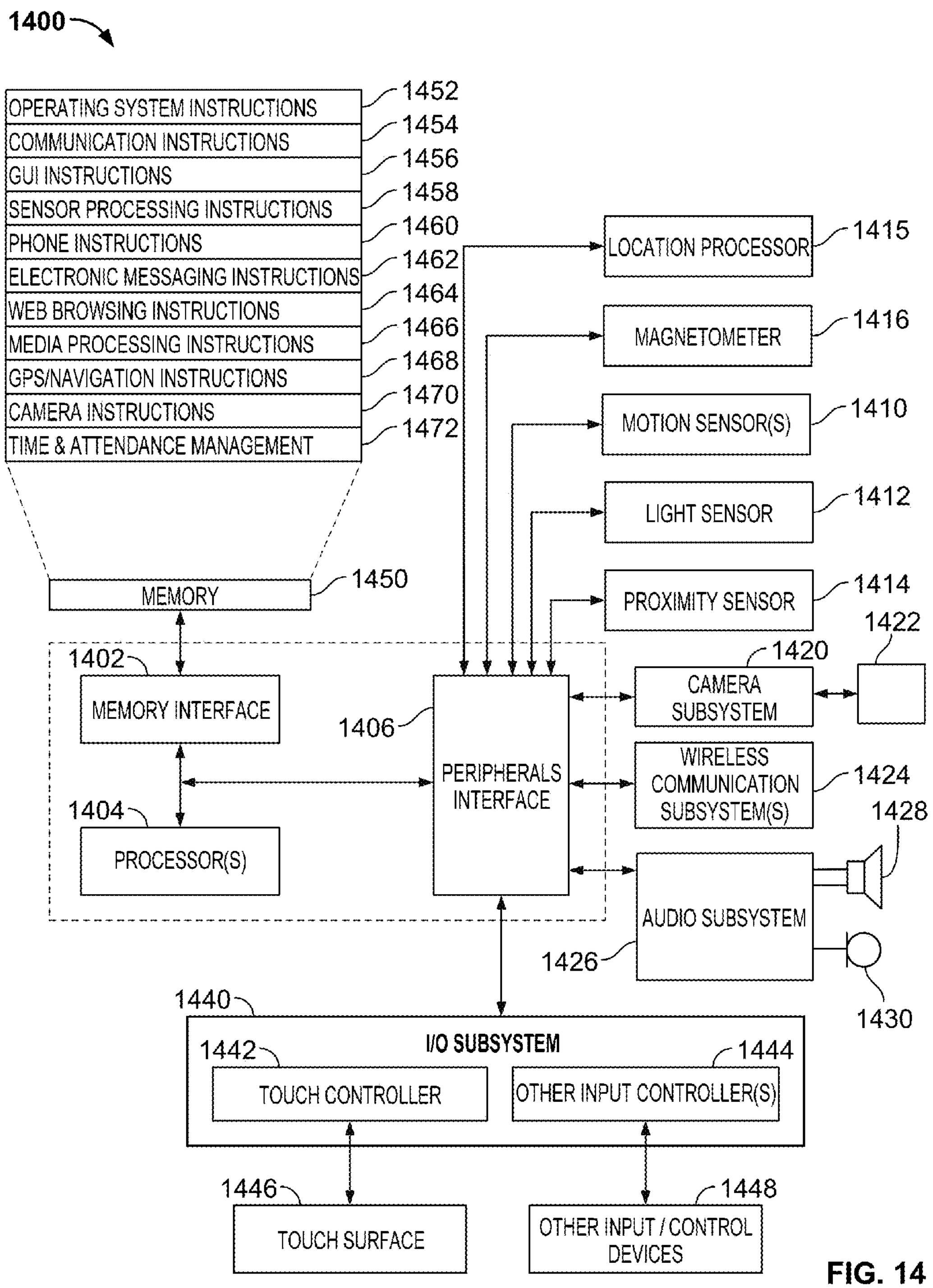
FIG. 14 is a block diagram of an exemplary architecture for a Cloud Clock capable of running a network-enabled time and attendance management application.

FIG. 14 is a block diagram of an exemplary architecture for a Cloud Clock Device capable of running a network-enabled time and attendance management application. Architecture 1400 can be implemented in any device for generating the features described in reference to FIGS. 1-11, including but not limited to portable or desktop computers, smart phones and electronic tablets, television systems, game consoles, kiosks and the like. Architecture 1400 can include memory interface 1402, data processor(s), image processor(s) or central processing unit(s) 1404, and peripherals interface 1406. Memory interface 1402, processor(s) 1404 or peripherals interface 1406 can be separate components or can be integrated in one or more integrated circuits. The various components can be coupled by one or more communication buses or signal lines.

Sensors, devices, and subsystems can be coupled to peripherals interface 706 to facilitate multiple functionalities. For example, motion sensor 1410, light sensor 1412, and proximity sensor 1414 can be coupled to peripherals interface 1406 to facilitate orientation, lighting, and proximity functions of the device. For example, in some implementations, light sensor 1412 can be utilized to facilitate adjusting the brightness of touch surface 1446. In some implementations, motion sensor 1410 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1406, such as a temperature sensor, a biometric sensor, or other sensing device, to facilitate related functionalities.

Location processor 1415 (e.g., GPS receiver) can be connected to peripherals interface 1406 to provide geo-positioning. Electronic magnetometer 1416 (e.g., an integrated circuit chip) can also be connected to peripherals interface 1406 to provide data that can be used to determine the direction of magnetic North. Thus, electronic magnetometer 1416 can be used as an electronic compass.

Camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1424. Communication subsystem(s) 1424 can include one or more wireless communication subsystems. Wireless communication subsystems 1424 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1424 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1424 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1426 can be coupled to a speaker 1428 and one or more microphones 1430 to facilitate voice-enabled functions, such as voice recognition, voice replication, digital recording, and telephony functions.

I/O subsystem 1440 can include touch controller 1442 and/or other input controller(s) 1444. Touch controller 1442 can be coupled to a touch surface 1446. Touch surface 1446 and touch controller 1442 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1446. In one implementation, touch surface 1446 can display virtual or soft buttons and a virtual keyboard, which can be used as an input/output device by the user.

Other input controller(s) 1444 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 1428 and/or microphone 1430.

In some implementations, device 1400 can present recorded audio and/or video files, such as MP3, AAC, and MPEG files. In some implementations, device 1400 can include the functionality of an MP3 player and may include a pin connector for tethering to other devices. Other input/output and control devices can be used.

Memory interface 1402 can be coupled to memory 1450. Memory 1450 can include high-speed random access memory or non-volatile memory, such as one or more magnetic disk storage devices, one or more optical storage devices, or flash memory (e.g., NAND, NOR). Memory 1450 can store operating system 1452, such as Darwin, RTXC, LINUX, UNIX, OS X, WINDOWS, or an embedded operating system such as VxWorks. Operating system 1452 may include instructions for handling basic system services and for performing hardware dependent tasks. In some implementations, operating system 1452 can include a kernel (e.g., UNIX kernel).

Memory 1450 may also store communication instructions 1454 to facilitate communicating with one or more additional devices, one or more computers or servers. Communication instructions 1454 can also be used to select an operational mode or communication medium for use by the device, based on a geographic location (obtained by the GPS/Navigation instructions 1468) of the device. Memory 1450 may include graphical user interface instructions 1456 to facilitate graphic user interface processing, such as generating the GUIs shown in FIGS. 1-11; sensor processing instructions 1458 to facilitate sensor-related processing and functions; phone instructions 1460 to facilitate phone-related processes and functions; electronic messaging instructions 1462 to facilitate electronic-messaging related processes and functions; web browsing instructions 1464 to facilitate web browsing-related processes and functions and display GUIs described in reference to FIGS. 1-11; media processing instructions 1466 to facilitate media processing-related processes and functions; GPS/Navigation instructions 1468 to facilitate GPS and navigation-related processes; camera instructions 1470 to facilitate camera-related processes and functions; and instructions 1472 for a time and attendance management application that is capable of displaying GUIs, as described in reference to FIGS. 1-11. The memory 1450 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1450 can include additional instructions or fewer instructions. Furthermore, various functions of the mobile device may be implemented in hardware and/or in software, including in one or more signal processing and/or application specific integrated circuits.

Network Service Architecture

Figure 15:
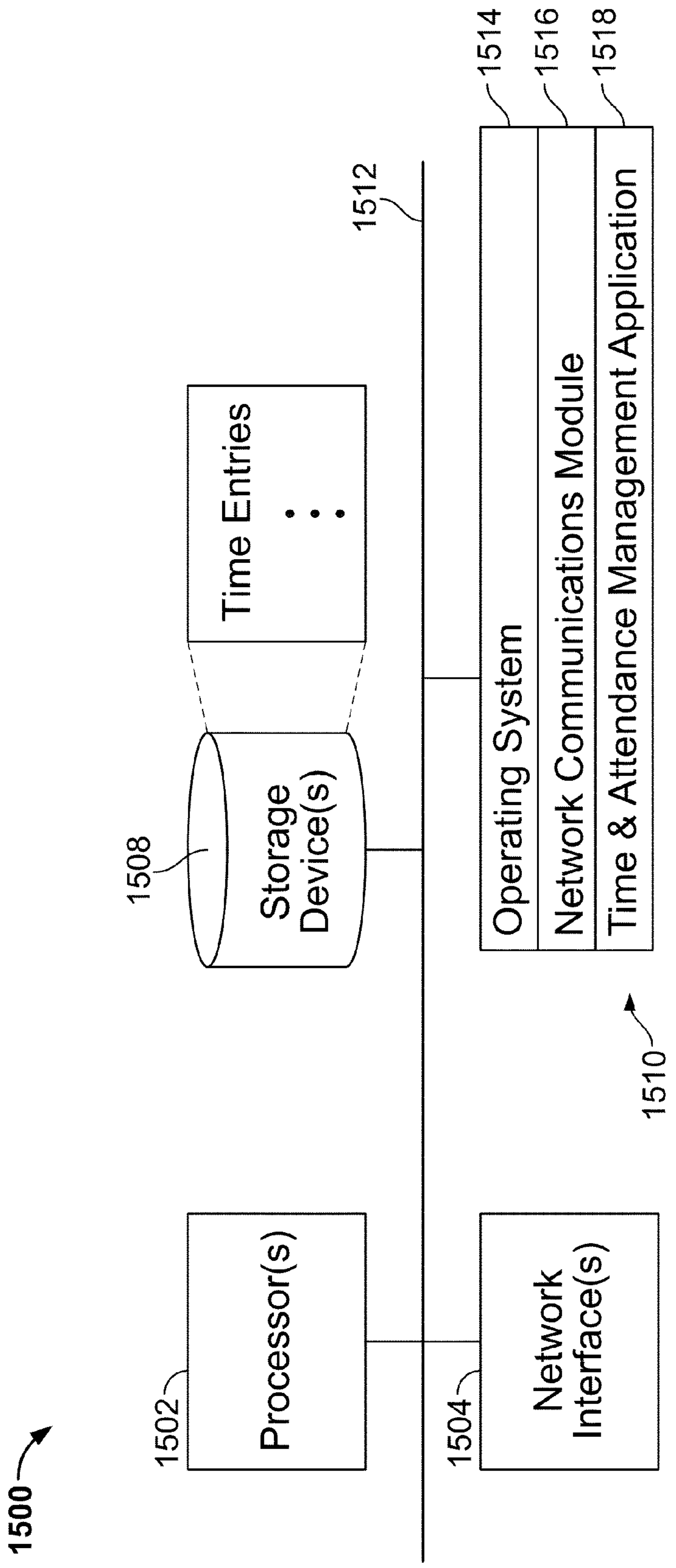
FIG. 15 is a block diagram of an exemplary architecture for a network service capable of providing network-enabled time and attendance management services.

FIG. 15 is a block diagram of an exemplary architecture 1500 for a network service (e.g., service 1330 of FIG. 13) capable of providing network-enabled time and attendance management services. In some implementations, architecture 1500 can include processors or processing cores 1502 (e.g., dual-core Intel® Xeon® Processors), network interface(s) 1504 (e.g., network interface cards), storage device 1508 and memory 1510. Each of these components can be coupled to one or more buses 1512, which can utilize various hardware and software for facilitating the transfer of data and control signals between components.

Memory 1510 can include operating system 1514, network communications module 1516 and time and attendance management application 1518. Operating system 1514 can be multi-user, multiprocessing, multitasking, multithreading, real time, etc. Operating system 1514 can perform basic tasks, including but not limited to: recognizing input from and providing output to client devices; keeping track and managing files and directories on computer-readable mediums (e.g., memory 1510 or storage device 1508); controlling peripheral devices; and managing traffic on the one or more buses 1512. Network communications module 1516 can include various components for establishing and maintaining network connections with client devices (e.g., software for implementing communication protocols, such as TCP/IP, HTTP, etc.).

The term "computer-readable medium" refers to any medium that participates in providing instructions to processor(s) 1502 for execution, including without limitation, non-volatile media (e.g., optical or magnetic disks), volatile media (e.g., memory) and transmission media. Transmission media includes, without limitation, coaxial cables, copper wire and fiber optics.

Architecture 1500 can serve Web pages for time and attendance management application 1518, as described in reference to FIGS. 1-11. Storage device 1508 can store time and attendance data (e.g., time entries) for a number of customers and other relevant data.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

determining whether a portable time entry device is at an authorized location, wherein determining whether the portable time entry device is at the authorized location comprises:

monitoring, using an acceleration sensor of the portable time entry device, movement of the portable time entry device;

determining whether movement of the portable time entry device corresponds to unauthorized displacement of the portable time entry device from a mounting;

upon determining that movement of the portable time entry device does not correspond to unauthorized displacement of the portable time entry device from the mounting, determining that the portable time entry device is at the authorized location;

upon determining that the portable time entry device is at the authorized location, performing a time entry operation with respect to a user, wherein the time entry operation comprises:

capturing, using a camera module of the portable time entry device, a digital image of a user displaying an identification card, the identification card including an identification code;

determining whether the user in the digital image is an employee;

upon determining that the user in the digital image is an employee, determining, based on the identification code, whether an employee associated with the identification card matches the employee; and upon determining that the employee associated with the identification card matches the employee, logging a time entry for the employee.

2. The method of claim 1, wherein determining whether the user in the digital image is an employee comprises:

identifying the user in the digital image using one or more face recognition techniques; and determining whether the identified user exists in an employee directory.

3. The method of claim 1, wherein determining, based on the identification code, whether an employee associated with the identification card matches the employee comprises:

reading the identification code;

identifying an employee associated with the identification code; and determining whether the employee associated with the identification code is the employee.

4. The method of claim 1, wherein, when the employee is punched in, logging a time entry for the employee comprises a punch out.

5. The method of claim 1, wherein, when the employee is punched out, logging a time entry for the employee comprises a punch in.

6. The method of claim 1, where the code is a bar code or a Quick Response code.

7. A system, comprising:

one or more processors;

memory coupled to the one or more processors and configured for storing instructions, which, when executed by the one or more processors, causes the one or more processors to perform operations comprising:

determining whether a portable time entry device is at an authorized location, wherein determining whether the portable time entry device is at the authorized location comprises:

monitoring, using an acceleration sensor of the portable time entry device, movement of the portable time entry device;

determining whether movement of the portable time entry device corresponds to unauthorized displacement of the portable time entry device from a mounting;

upon determining that movement of the portable time entry device does not correspond to unauthorized displacement of the portable time entry device from the mounting, determining that the portable time entry device is at the authorized location;

upon determining that the portable time entry device is at the authorized location, performing a time entry operation with respect to a user, wherein the time entry operation comprises:

capturing, using a camera module of the portable time entry device, a digital image of a user displaying an identification card, the identification card including an identification code;

determining whether the user in the digital image is an employee;

upon determining that the user in the digital image is an employee, determining, based on the identification code, whether an employee associated with the identification card matches the employee; and upon determining that the employee associated with the identification card matches the employee, logging a time entry for the employee.

8. The system of claim 7, wherein determining whether the user in the digital image is an employee comprises:

identifying the user in the digital image using one or more face recognition techniques; and determining whether the identified user exists in an employee directory.

9. The system of claim 7, wherein determining, based on the identification code, whether an employee associated with the identification card matches the employee comprises:

reading the identification code;

identifying an employee associated with the identification code; and determining whether the employee associated with the identification code is the employee.

10. The system of claim 7, wherein, when the employee is punched in, logging a time entry for the employee comprises a punch out.

11. The system of claim 7, wherein, when the employee is punched out, logging a time entry for the employee comprises a punch in.

12. The system of claim 7, where the code is a bar code or a Quick Response code.

13. The system of claim 7, wherein the portable time entry device comprises a portable tablet computer, and wherein the camera module is a front facing camera of the portable tablet computer.

14. A computer program product tangibly embodied in a non-transitory computer-readable storage medium, the computer program product including instructions that, when executed, perform the following operations:

determining whether a portable time entry device is at an authorized location, wherein determining whether the portable time entry device is at the authorized location comprises:

monitoring, using an acceleration sensor of the portable time entry device, movement of the portable time entry device;

determining whether movement of the portable time entry device corresponds to unauthorized displacement of the portable time entry device from a mounting;

upon determining that movement of the portable time entry device does not correspond to unauthorized displacement of the portable time entry device from the mounting, determining that the portable time entry device is at the authorized location;

upon determining that the portable time entry device is at the authorized location, performing a time entry operation with respect to a user, wherein the time entry operation comprises:

capturing, using a camera module of the portable time entry device, a digital image of a user displaying an identification card, the identification card including an identification code;

determining whether the user in the digital image is an employee;

upon determining that the user in the digital image is an employee, determining, based on the identification code, whether an employee associated with the identification card matches the employee; and upon determining that the employee associated with the identification card matches the employee, logging a time entry for the employee.

15. The computer program product of claim 14, wherein determining whether the user in the digital image is an employee comprises:

identifying the user in the digital image using one or more face recognition techniques; and determining whether the identified user exists in an employee directory.

16. The computer program product of claim 14, wherein determining, based on the identification code, whether an employee associated with the identification card matches the employee comprises:

reading the identification code;

identifying an employee associated with the identification code; and determining whether the employee associated with the identification code is the employee.

17. The computer program product of claim 14, wherein, when the employee is punched in, logging a time entry for the employee comprises a punch out.

18. The computer program product of claim 14, wherein, when the employee is punched out, logging a time entry for the employee comprises a punch in.

19. The computer program product of claim 14, where the code is a bar code or a Quick Response code.

20. The computer program product of claim 14, wherein the portable time entry device comprises a portable tablet computer, and wherein the camera module is a front facing camera of the portable tablet computer.

21. The method of claim 1, wherein determining whether the portable time entry device is at the authorized location further comprises:

determining, using a location sensor of the portable time entry device, the location of the portable time entry device;

determining whether the portable time entry device is within a pre-determined geographical region corresponding to the authorized location;

upon determining that the portable time entry device is within the pre-determined geographical region, determining that the portable time entry device is at the authorized location.

22. The method of claim 21, wherein the location sensor is a global positioning system (GPS) sensor.

23. The method of claim 21, wherein the pre-determined geographical region is enclosed by a pre-determined geographical boundary.

24. The method of claim 21, the method further comprising:

upon determining that the portable time entry device is not within the pre-determined graphical region, determining that the portable time entry device is not at the authorized location and preventing performance of the time entry operation.

25. The method of claim 1, the method further comprising:

upon determining that movement of the portable time entry device corresponds to unauthorized displacement of the portable time entry device, determining that the portable time entry device is not at the authorized location and preventing performance of the time entry operation.

* * * * *